United States Patent
De La Cropte De Chanterac et al.

(10) Patent No.: US 9,647,489 B2
(45) Date of Patent: May 9, 2017

(54) BROWNOUT AVOIDANCE

(71) Applicant: Apple Inc., Cupertino, CA (US)

(72) Inventors: Cyril De La Cropte De Chanterac, San Francisco, CA (US); David A. Hardell, San Jose, CA (US); Matthew L. Semersky, San Jose, CA (US); Yehonatan Perez, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/812,904

(22) Filed: Jul. 29, 2015

(65) Prior Publication Data

US 2016/0064940 A1    Mar. 3, 2016

Related U.S. Application Data

(60) Provisional application No. 62/042,172, filed on Aug. 26, 2014.

(51) Int. Cl.
*G06F 1/32* (2006.01)
*H02J 9/00* (2006.01)
*H02J 7/00* (2006.01)

(52) U.S. Cl.
CPC ............ *H02J 9/002* (2013.01); *H02J 7/0029* (2013.01); *H02J 2007/004* (2013.01)

(58) Field of Classification Search
CPC .... G06F 1/26; G06F 1/3212; H04W 52/0261; H04W 52/0264
USPC ........................................ 713/320, 323, 300
See application file for complete search history.

(56) References Cited

U.S. PATENT DOCUMENTS

| 5,483,261 A | 1/1996 | Yasutake |
|---|---|---|
| 5,488,204 A | 1/1996 | Mead et al. |
| 5,825,352 A | 10/1998 | Bisset et al. |
| 5,835,079 A | 11/1998 | Shieh |

(Continued)

FOREIGN PATENT DOCUMENTS

| JP | 2000-163031 A | 6/2000 |
|---|---|---|
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Vincent Tran
(74) *Attorney, Agent, or Firm* — Morrison and Foerster LLP

(57) ABSTRACT

Examples of the disclosure are directed to methods of managing power of various modules of an electronic device to prevent the voltage of the battery from falling to an undervoltage lockout (UVLO) threshold. In some examples, software operating on the electronic device or an associated electronic device (e.g., a paired electronic device) may assign power budgets to one or more modules, thereby preventing each module from drawing its maximum current capacity and causing the battery's voltage level to fall to the UVLO threshold. In some examples, a pre-UVLO threshold (i.e., a threshold higher than the UVLO threshold) may be used to modify the states of one or more modules to save power as the voltage of the battery approaches the UVLO threshold, but before the device must be fully powered off.

36 Claims, 8 Drawing Sheets

(56) References Cited

U.S. PATENT DOCUMENTS

| | | | |
|---|---|---|---|
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,631,201 | B2 * | 12/2009 | Hansalia .............. H04L 12/10 713/300 |
| 7,663,607 | B2 | 2/2010 | Hotelling et al. |
| 8,479,122 | B2 | 7/2013 | Hotelling et al. |
| 8,937,987 | B2 * | 1/2015 | Alberth ............... H04B 1/1607 375/219 |
| 2003/0050104 | A1 * | 3/2003 | Matsumura ....... H04W 52/0225 455/574 |
| 2003/0149904 | A1 * | 8/2003 | Kim ..................... G06F 1/3203 713/330 |
| 2003/0158609 | A1 * | 8/2003 | Chiu ................. H04W 52/0274 700/22 |
| 2006/0005057 | A1 * | 1/2006 | Nalawadi ............ G06F 1/3203 713/320 |
| 2006/0053321 | A1 * | 3/2006 | Mizusawa ........... H04B 1/0458 713/300 |
| 2006/0197753 | A1 | 9/2006 | Hotelling |
| 2008/0022140 | A1 * | 1/2008 | Yamada ................ G06F 1/206 713/322 |
| 2008/0178019 | A1 * | 7/2008 | McGrane .............. G06F 1/26 713/320 |
| 2009/0058670 | A1 * | 3/2009 | Sweeney ............. G08B 21/023 340/686.1 |
| 2009/0100274 | A1 * | 4/2009 | Diab ..................... H04L 12/10 713/300 |
| 2009/0237252 | A1 * | 9/2009 | Inano ................... G06K 7/0008 340/572.1 |
| 2009/0254914 | A1 * | 10/2009 | Sundaresan ............ G06F 9/505 718/103 |
| 2010/0030392 | A1 * | 2/2010 | Ferentz ................. H04L 12/10 700/295 |
| 2010/0162006 | A1 * | 6/2010 | Therien .................. G06F 9/50 713/300 |
| 2010/0185882 | A1 * | 7/2010 | Arnold .................. G06F 1/329 713/320 |
| 2010/0211804 | A1 * | 8/2010 | Brumley ................ G06F 1/206 713/300 |
| 2011/0072435 | A1 * | 3/2011 | Yasutake .............. G06F 9/4881 718/103 |
| 2011/0234617 | A1 * | 9/2011 | Watanabe .............. G06F 1/3203 345/589 |
| 2011/0264935 | A1 * | 10/2011 | Shetty .................. G06F 1/3203 713/320 |
| 2012/0254633 | A1 * | 10/2012 | Vilhauer ............... G06F 1/3212 713/300 |
| 2014/0245031 | A1 * | 8/2014 | Hamdi .................... G06F 1/28 713/300 |
| 2014/0365790 | A1 * | 12/2014 | Chen ................... G06F 1/3212 713/300 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

BROWNOUT AVOIDANCE

CROSS-REFERENCE TO RELATED APPLICATION

This application claims the benefit under 35 U.S.C. §119(e) of U.S. Provisional Patent Application No. 62/042,172, filed Aug. 26, 2014, the content of which is incorporated by reference herein in its entirety for all purposes.

FIELD OF THE DISCLOSURE

This relates generally to power management of an electronic device.

BACKGROUND OF THE DISCLOSURE

An electronic device may require a power supply, such as a battery. Further, the electronic device may require that the power supply have a certain minimum voltage in order to function properly. Accordingly, an electronic device may monitor the voltage of its power supply, and power down the electronic device if the voltage falls to an undervoltage lockout (UVLO) threshold. This is known as a brownout, when power is still available to the device, but the voltage is too low to function properly.

SUMMARY OF THE DISCLOSURE

An electronic device may require a power supply, such as a battery. Further, the electronic device may require that the power supply have a certain minimum voltage in order to function properly. Accordingly, an electronic device may monitor the voltage of its power supply, and power down the electronic device if the voltage falls to an undervoltage lockout (UVLO) threshold. This is known as a brownout, when power is still available to the device, but the voltage is too low to function properly. For example, if the voltage is already near the UVLO threshold, and multiple modules draw power at once (e.g., speakers, Wi-Fi, and Bluetooth), electrical transients may cause the voltage to momentarily fall below the UVLO threshold, thereby causing the device to power down.

Examples of the disclosure are directed to methods of managing the power of various modules of the electronic device to prevent the voltage of the battery from falling to the undervoltage lockout (UVLO) threshold. In some examples, software operating on the electronic device or an associated electronic device (e.g., a paired electronic device) may assign power budgets to one or more modules, thereby preventing each module from drawing its maximum current capacity and causing the battery's voltage level to fall to the UVLO threshold. In some examples, a pre-UVLO threshold (i.e., a threshold higher than the UVLO threshold) may be used to modify the states of one or more modules to save power as the voltage of the battery approaches the UVLO threshold, but before the device must be fully powered off. An electronic device may be any electronic device such as a desktop computer, portable multifunction device (e.g., a smartphone), wearable device, tablet computer, etc. In some examples, methods described herein may be useful for devices that have relatively low battery capacity for a portable device. Further, the methods described herein may be particularly useful in cold temperature conditions where battery impedance may be particularly problematic.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

An electronic device may require a power supply, such as a battery. Further, the electronic device may require that the power supply have a certain minimum voltage in order to function properly. Accordingly, an electronic device may monitor the voltage of its power supply, and power down the electronic device if the voltage falls to an undervoltage lockout (UVLO) threshold. This is known as a brownout, when power is still available to the device, but the voltage is too low to function properly. For example, if the voltage is already near the UVLO threshold, and multiple modules draw power at once (e.g., speakers, Wi-Fi, and Bluetooth), electrical transients may cause the voltage to momentarily fall below the UVLO threshold, thereby causing the device to power down.

Examples of the disclosure are directed to methods of managing the power of various modules of the electronic device to prevent the voltage of the battery from falling to the undervoltage lockout (UVLO) threshold. In some examples, software operating on the electronic device or an associated electronic device (e.g., a paired electronic device) may assign power budgets to one or more modules, thereby preventing each module from drawing its maximum current capacity and causing the battery's voltage level to fall to the UVLO threshold. In some examples, a pre-UVLO threshold (i.e., a threshold higher than the UVLO threshold) may be used to modify the states of one or more modules to save power as the voltage of the battery approaches the UVLO threshold, but before the device must be fully powered off. An electronic device may be any electronic device such as a desktop computer, portable multifunction device (e.g., a smartphone), wearable device, tablet computer, etc. In some examples, methods described herein may be useful for devices that have relatively low battery capacity for a portable device. Further, the methods described herein may be particularly useful in cold temperature conditions where battery impedance may be particularly problematic.

Although examples disclosed herein may be described and illustrated herein primarily in terms of an electronic device having a battery, it should be understood that the examples are not so limited, but are additionally applicable to devices including any kind of power supply, such as an alternating current (AC) power supply. Further, although examples herein may be described and illustrated primarily in terms of two or three modules, it should be understood that the examples are not so limited, but are additionally applicable to an arbitrary number of modules.

Figure 1:
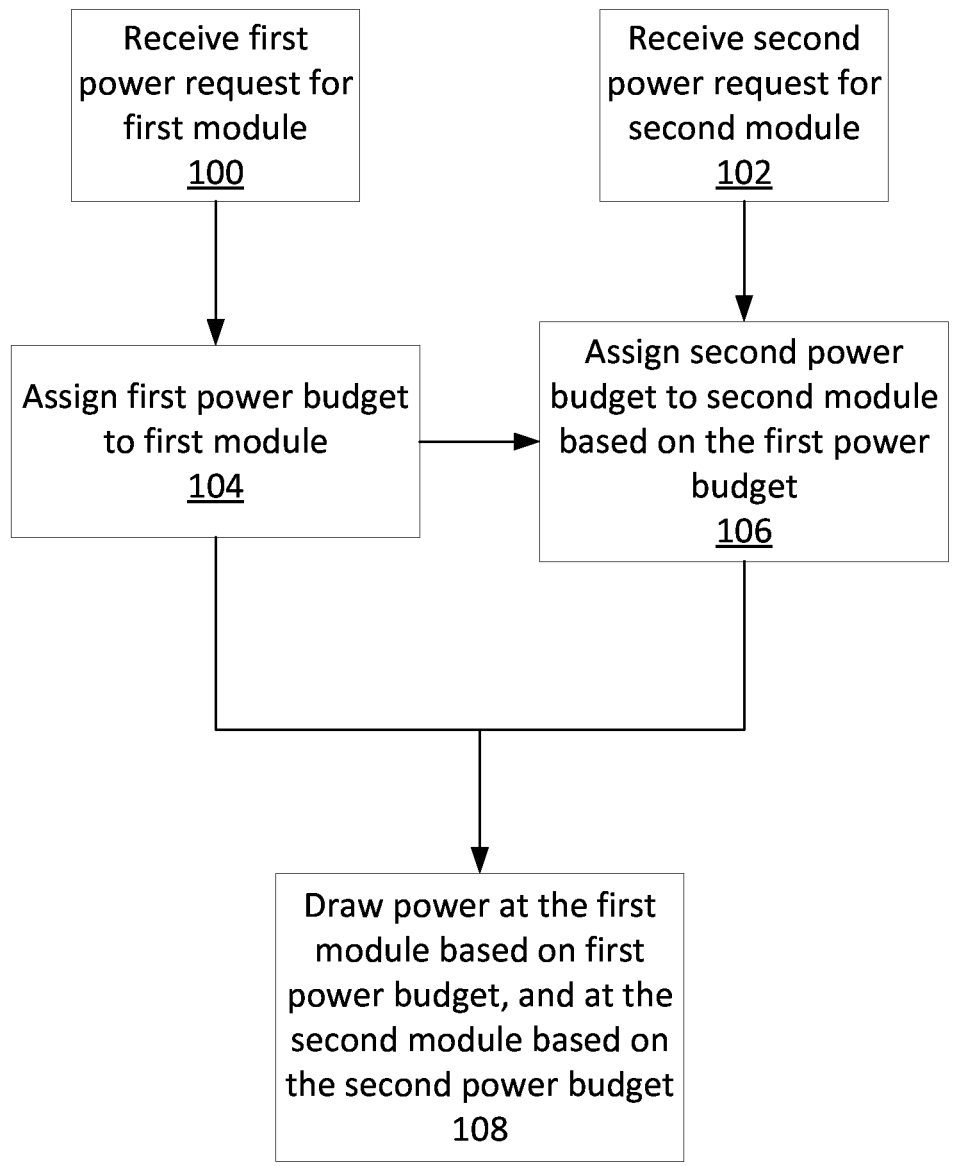
FIG. 1 illustrates an exemplary method of assigning power budgets for first and second modules of an electronic device, according to examples of the disclosure.

FIG. 1 illustrates an exemplary method of assigning power budgets for first and second modules of an electronic device, according to examples of the disclosure. The method may be performed at an electronic device including a plurality of modules (e.g., hardware peripherals such as a speaker, microphone, Wi-Fi controller, Bluetooth, near field communication (NFC), accelerometer, gyroscope, magnetometer, global positioning system (GPS), central processing unit (CPU), graphics processing unit (GPU), photoplethysmogram (PPG) sensor, heart rate monitor, electrocardiogram (EKG) sensor, etc.).

A first power request for a first module of the plurality of modules (e.g., a request to allow the first module to draw its maximum current capacity or some percentage of its maximum current capacity) may be received (100). The request may come from the first module itself, a separate electronic device (e.g., a paired device), or from software requesting the use of the first module, among other possibilities. Further, a second power request for a second module of the plurality of modules may be received (102). Similarly, the second power request can come from the second module, the paired device, or from software requesting the use of the second module, among other possibilities. Power requests may be received by hardware or software components, such as peak power manager 300 in FIG. 3.

A first power budget may be assigned (104) to the first module (e.g., allowing the first module to draw some percentage of the first module's maximum current capacity in accordance with the first power budget, or assigning a zero budget and/or denying the first power request). In some examples, assigning the first power budget to the first module may be based on a charge level of a battery of the electronic device (e.g., the first power budget may be reduced if the charge level is below a threshold level). In some examples, one or more predetermined budgets may be stored for a particular module, and assigning a budget may include selecting one of the predetermined budgets. A power budget may be assigned on a scale of 0-100 (e.g., as a percentage of the module's maximum current capacity). A power budget may limit how much power the module can draw at one time. That is, a module can cumulatively draw more than its power budget, but the module's power draw at any given moment cannot exceed the budget. Power budgets may be assigned by hardware or software components, such as peak power manager 300 in FIG. 3.

A second power budget may be assigned (106) to the second module based on the first power budget (e.g., so that the current drawn by the first and second modules does not peak to a level unsustainable by the battery). For example, the second power budget may be assigned based on a rule that a total power budget (e.g., the sum of the first and second power budgets, and possibly additional power budgets) cannot exceed a budget limit. In some examples, the budget limit may be set at or under the total power that can be safely drawn without triggering a brownout condition, and keeping the total power budget to the budget limit can thereby prevent any modules from triggering a brownout condition. In some examples, a plurality of predetermined budgets may be stored for the second module, and a relatively low budget may be selected for the second module based on the assigned budget for the first module.

In some examples, a first priority may be assigned to the first module and a second priority may be assigned to the second module, and assigning the second power budget may be further based on the first and second priorities (e.g., a module with a relatively high priority, such as a speaker, may be assigned its requested budget, whereas a module with a relatively low priority, such as a GPS, may be assigned less than its requested budget and/or its request may be denied). In some examples, the first priority may be assigned with respect to a particular functionality of the first module (e.g., different functionalities of a module may have different priorities: a speaker may have a relatively low priority for playing a text message notification and a relatively high priority for playing a telephone call ringtone). Priorities may be assigned by hardware or software components, such as peak power manager 300 in FIG. 3.

In some examples, the first and/or second power budgets may be assigned based on a determination of whether the device is in contact with a user (e.g., in a user's pocket, strapped to a user's arm, in the user's hand, etc.). Such a determination may be made based on light sensing, heat sensing, motion sensing, touch sensing, etc. If the device is not in contact with the user, then modules such as vibration/haptic feedback may be assigned a relatively low priority (e.g., because vibration is of limited utility when the device is not in contact with a user).

In some examples, it may be determined that the first power request is associated with a user-initiated task, and the first priority may be assigned based on the determination that the first power request is associated with a user-initiated task (e.g., a user-initiated task may be given a higher priority than an automated task; the speaker may be given a relatively high priority when the user requests that music be played, whereas the Wi-Fi controller may be given a relatively low priority when it is being used to automatically check for app updates in the background).

In some examples, the first power budget may be reduced based on a determination that the second priority is higher than the first priority (e.g., a module with a relatively high priority may effectively take power budget away from a module with a relatively low priority that has already been assigned a power budget). In some examples, reducing the first power budget may include notifying the first module that the first power budget has been revoked, and reducing power to the first module (or powering off the first module), wherein the second power budget may be assigned only after the power to the first module has been reduced (or powered off). Power budgets may be modified (reduced, revoked, increased, etc.) by hardware or software components, such as peak power manager 300 in FIG. 3.

Power may be drawn (108) at the first module based on the first power budget and at the second module based on the second power budget (e.g., drawing current at a level no higher than the budgeted level).

In some examples, a third power request for a third module of the plurality of modules may be received. The third power request may be denied based on the first and second power budgets (e.g., based on a rule that the third module cannot run while the first and second modules draw power at the first and second power budgets, and/or based on priorities of the first and second modules being higher than a priority of the third module).

In some examples, certain combinations of modules may be excluded, and budgets may be assigned accordingly. For example, a power request for a GPS (e.g., a relatively low priority module) may be denied based on budgets being already assigned to a speaker and a Wi-Fi controller (e.g., relatively high priority modules). In some examples, if budgets are already assigned to a Wi-Fi controller and a GPS, and a power request is made for a speaker, the budget assigned to the GPS may be revoked and the power request to the speaker may be granted.

In some examples, the electronic device may include a power supply (e.g., a battery). A first characteristic of the power supply (e.g., a voltage level, a charge level of a battery, etc.) may be obtained, and it may be determined that the first characteristic is lower than a first threshold (e.g., a UVLO threshold or threshold higher than the UVLO threshold). The first power budget may be assigned to the first module based on the determination that the first characteristic is lower than the first threshold (e.g., assigning a relatively lower power budget and/or reducing a power budget because the first characteristic is lower than the first threshold; a relatively low priority module may have a reduced power budget if the first characteristic is lower than the first threshold; etc.). In some examples, the first power budget may be assigned to the first module based on the relationship between the first characteristic and the first threshold over time (e.g., assigning a relatively low power budget and/or reducing a power budget if the first characteristic is frequently lower the first threshold, or if the first characteristic is lower than the first threshold for at least a set duration of time).

In some examples, power budgets are assigned to respective modules in response to a first module requesting power. In such a case, a budget may be assigned to the first module requesting power, and/or a second module may have a budget assigned/adjusted/revoked in response to the first module requesting power (e.g., if the second module's budget needs to be lowered or revoked to accommodate the first module's power draw).

In some examples, power budgets may be assigned or adjusted in response to events other than power requests. For example, power budgets may be adjusted in response to changes in battery level (e.g., one or more budgets may be reduced in response to a battery level falling beneath a threshold level), in response to changes in charging state (e.g., one or more budgets may be increased when the device's battery is being charged), and/or in response to elapsed time (e.g., budgets may be periodically adjusted or re-determined every two hours).

Figure 2:
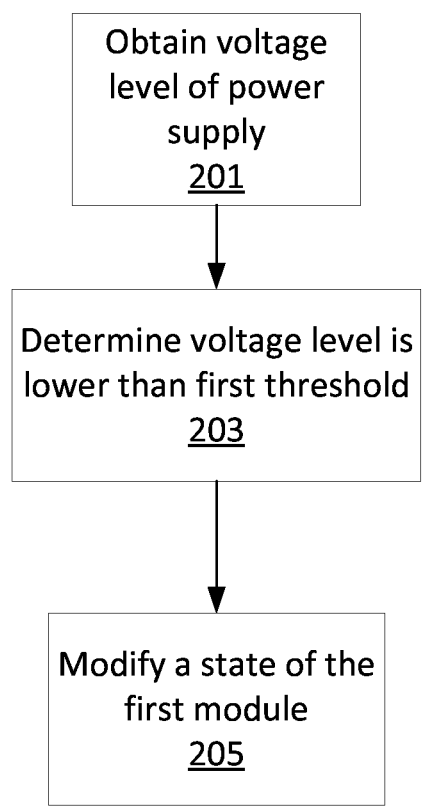
FIG. 2 illustrates an exemplary method of modifying a state of a module based on a pre-UVLO threshold, according to examples of the disclosure.

FIG. 2 illustrates an exemplary method of modifying a state of a module based on a pre-UVLO threshold, according to examples of the disclosure. The method may be performed at an electronic device including a power supply (e.g., a battery) and a first module (e.g., a hardware peripheral such as a speaker, microphone, Wi-Fi controller, Bluetooth, near field communication (NFC), accelerometer, gyroscope, magnetometer, GPS, etc.).

Figure 3:
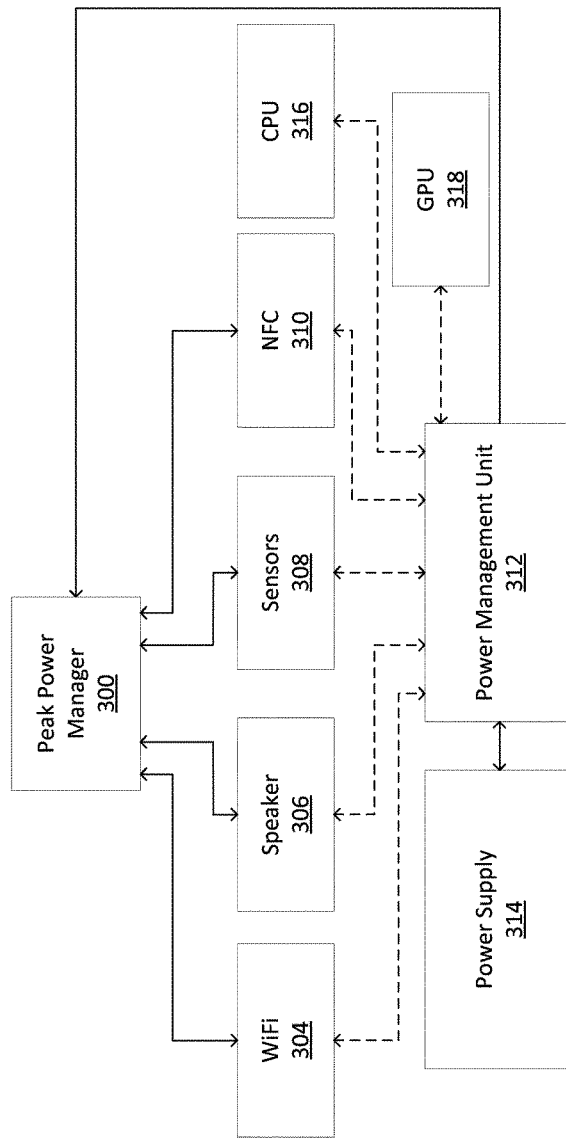
FIG. 3 is a block diagram illustrating an example of software and hardware interactions according to examples of the disclosure.

A voltage level of the power supply may be obtained (201), and it may be determined that the voltage level is lower than a first threshold (203). For example, the first threshold may be a pre-UVLO threshold (e.g., 3.8 V), higher than the UVLO threshold (e.g., 3.5 V). The voltage level may be compared to the first threshold by hardware or software components such as power management unit 312, as illustrated in FIG. 3.

In accordance with a determination that the voltage level is lower than the first threshold, a state of the first module may be modified (205) (e.g., turning off the first module, changing a mode of the first module, etc., so as to prevent the module's usage from pushing the voltage level of the power supply below an undervoltage lockout (UVLO) threshold). In some examples, modifying the state may include preventing the first module from drawing power for a predefined period of time (e.g., stopping the Wi-Fi radio for 20-40 ms, or some other time period long enough for a peak current to cease, among other possibilities). In some examples, modifying the state may include changing a mode of the first module for a predefined period of time (e.g., throttling the CPU clock, reducing a core voltage of the CPU, and disabling one or more features of a sensor, among other possibilities). In some examples, one or more power budgets may be assigned or modified (e.g., reduced) based on a determination that the voltage level is lower than the first threshold. Modifying the state of one or more components and/or assigning and modifying power budgets may be performed by hardware or software components, such as power management unit 312 and/or peak power manager 300, as illustrated in FIG. 3.

In some examples, it may be determined that the voltage level is lower than a second threshold (e.g., an undervoltage lockout (UVLO) threshold), lower than the first threshold. In accordance with a determination that the voltage level is lower than the second threshold, the device may be powered off.

In some examples, the state of the first module may remain modified for a predetermined period of time or until the voltage level is above a third threshold (e.g., higher than the first threshold) for the predetermined period of time. After the voltage level is above the third threshold for the predetermined period of time, the state of the first module may be modified back (e.g., turning on the first module, unthrottling the CPU clock, increasing the core voltage of the CPU, enabling one or more features of a sensor, etc.).

FIG. 3 is a block diagram illustrating an example of software and hardware interactions (such as the methods described with reference to FIGS. 1 and 2) according to examples of the disclosure. Each block and/or each connection between the blocks in FIG. 3 may represent one or more hardware or software modules.

Peak power manager 300 may receive power requests from one or more modules, such as Wi-Fi 304, speaker 306, sensors 308, NFC 310, CPU 316, and GPU 318. The peak power manager 300 may assign/modify budgets for the one or more modules, and accept, deny, or revoke the power requests received from the modules. Each module 304, 306, 308, 310, 316, and 318 may receive its assigned budget from the peak power manager 300. The peak power manager 300 may store in a computer-readable medium the budgets assigned to each module, state information for each module, priorities for each module, etc.

In some examples, a power management unit 312 may monitor the voltage level of a power supply 314 and compare the voltage level to a pre-UVLO threshold and/or a UVLO threshold. The power management unit 312 may then modify the state of one or more modules (e.g., by throttling the CPU 316 or the GPU 318, etc.) in accordance with a determination that the voltage level has dropped below the pre-UVLO threshold. In some examples, the power management unit 312 may notify the peak power manager 300 that voltage level has dropped below the pre-UVLO threshold (e.g., by sending a pre-UVLO signal as described with reference to FIG. 4), and the peak power manager may assign/modify one or more budgets in accordance (e.g., a power budget for a low priority module may be reduced or revoked in response to a determination that voltage level has dropped below the pre-UVLO threshold).

In some examples, the power management unit 312 in FIG. 3 may have a voltage comparator detecting pre-UVLO conditions (e.g., based on detection of a voltage level of the power supply 314 dropping below a pre-UVLO threshold voltage). The output signal generated by the power management unit voltage comparator in FIG. 3 may be observed as a pulsed signal and recorded by the peak power manager 300. In some examples, the peak power manager can use hardware assistance from a pulse width modulator (PWM) device used as an input signal monitoring device, accounting for the time the input signal is set at high or low level. For example, the PWM device might increment a counter when the signal is at high level, switch to another time counter when the signal switches to low level. The PWM device might also have the ability to generate interrupts to the peak power manager when the signal transitions to high or low level or when the signal is asserted at high or low level for a given time above a certain threshold.

Figure 4:
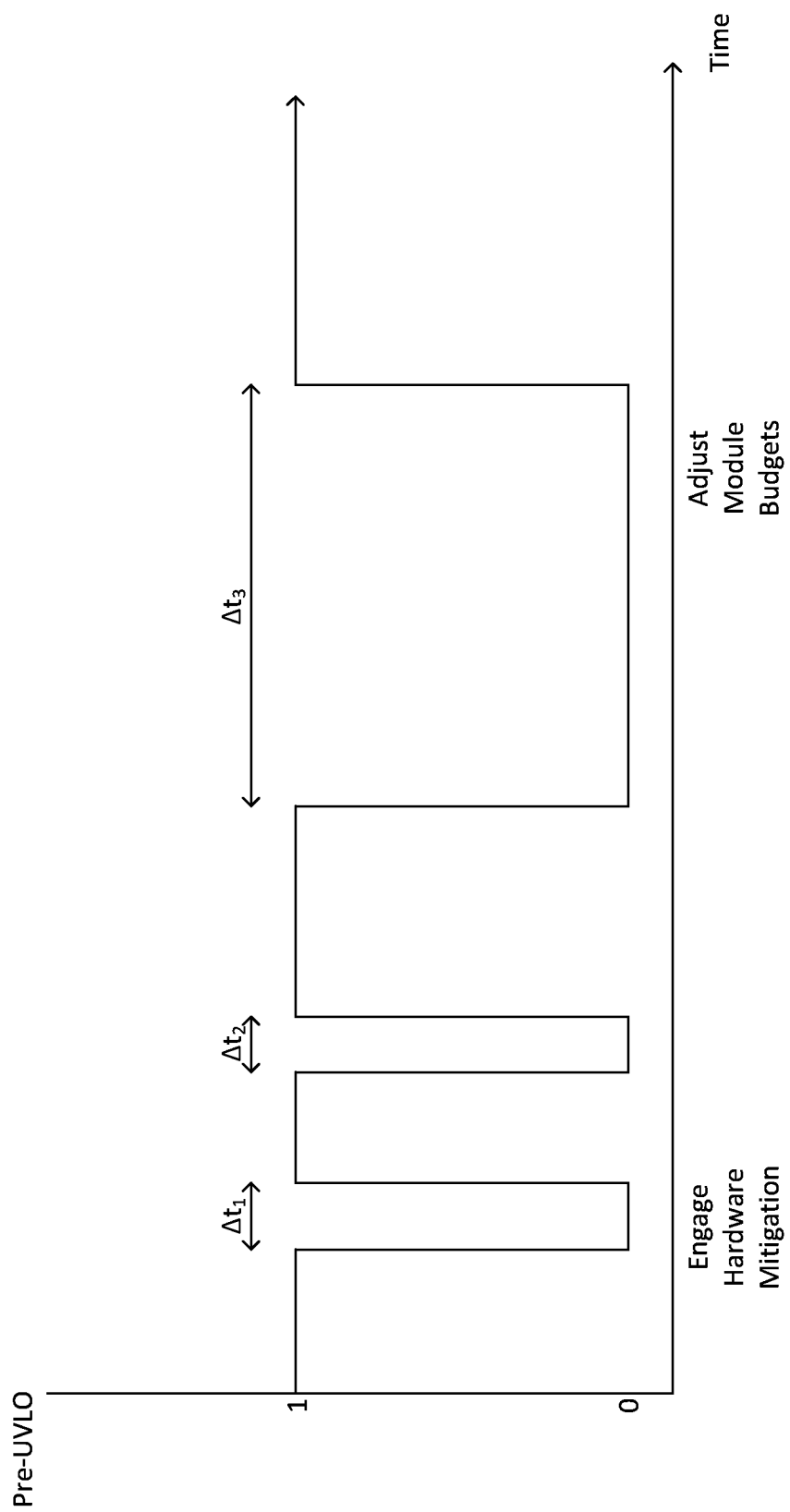
FIG. 4 illustrates an exemplary pre-UVLO signal according to examples of the disclosure.

FIG. 4 illustrates an exemplary pre-UVLO signal according to examples of the disclosure. The pre-UVLO signal may drop to zero for as long as the voltage level of the power supply 314 is below the pre-UVLO threshold voltage. For example, in FIG. 4, the voltage level of the power supply has dropped below the pre-UVLO threshold voltage three times, $\Delta t_1$, $\Delta t_2$, and $\Delta t_3$. As described with reference to FIG. 2, hardware mitigation may be engaged at the first detection of the voltage level falling below the pre-UVLO threshold voltage. However, the duration of each voltage drop may be monitored, and software mitigation (e.g., adjusting software budgets as described with reference to FIG. 1) may be engaged in response to the duration of a voltage drop exceeding a predetermined threshold duration. For example, the first two voltage drops in FIG. 4, $\Delta t_1$ and $\Delta t_2$, are relatively short compared to $\Delta t_3$. If $\Delta t_3$ exceeds a predetermined threshold duration, then one or more module budgets may be adjusted (e.g., drastically reduced) in an attempt to bring the voltage level of the power supply back up above the pre-UVLO threshold voltage. In some examples, each power drop $\Delta t$ may be categorized based on its duration (e.g., short (0-100 ms), moderate (100-200 ms), long (at least 200 ms), etc.), and software mitigation may be engaged in response to detection of a certain number of voltage drops in a particular category. For example, software mitigation may be engaged in response to three or more voltage drops categorized as long (e.g., voltage drops lasting at least 200 ms).

In some examples, the methods described herein may be used to enable specific use cases of an electronic device. For example, it may be more important for a user to hear a telephone call ringtone than a short message service (SMS) notification. Accordingly, the speaker module may have a higher priority for a ringtone than for an SMS notification. Further, these priorities may result in a ringtone power request getting a higher budget than an SMS notification power request. As a result, the ringtone may be played louder by the speaker than the SMS notification due to the ringtone having more available power in its budget.

In another example, many applications stream media (e.g., audio or video) over Wi-Fi and play back the media over a speaker. Accordingly, it may be important to assign budgets in such a way that Wi-Fi and media play back can happen concurrently (e.g., both modules may be assigned high priorities and other modules may receive relatively low budgets as a result). Further, haptic feedback when typing may be an essential part of a virtual keyboard in a media streaming application, and thus budgets may need to be assigned so that all three of these functionalities (haptic feedback, Wi-Fi, speaker) can be performed concurrently.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 5:
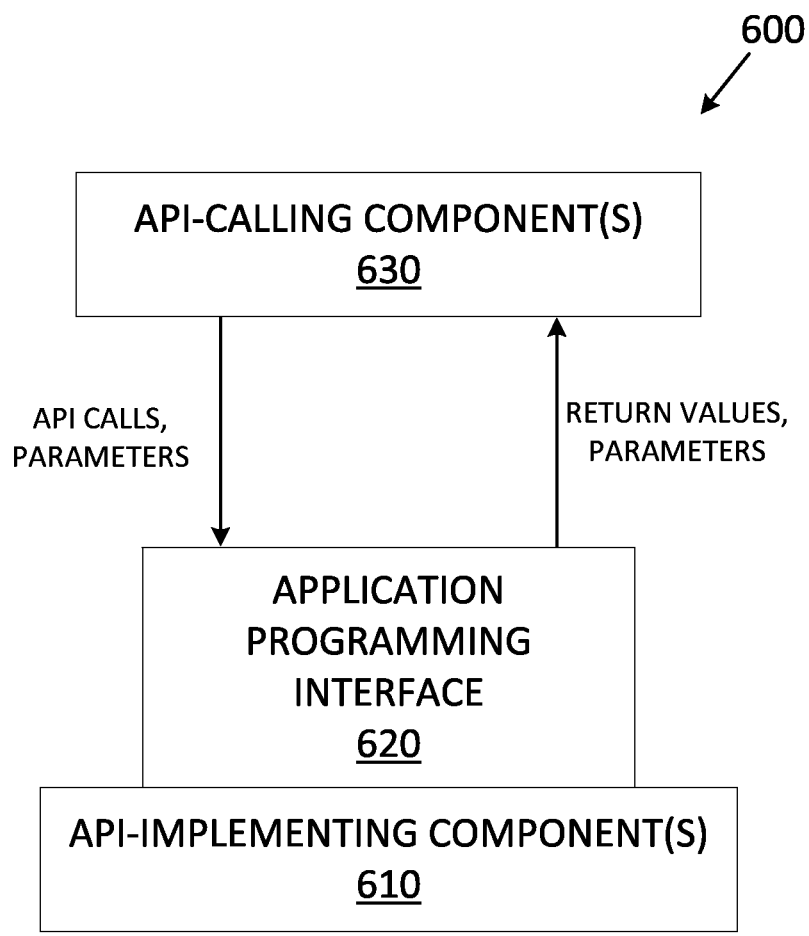
FIG. 5 is a block diagram illustrating an exemplary API architecture, which may be used in some examples of the disclosure.

FIG. 5 is a block diagram illustrating an exemplary API architecture, which may be used in some examples of the disclosure. As shown in FIG. 5, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 5 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 6:
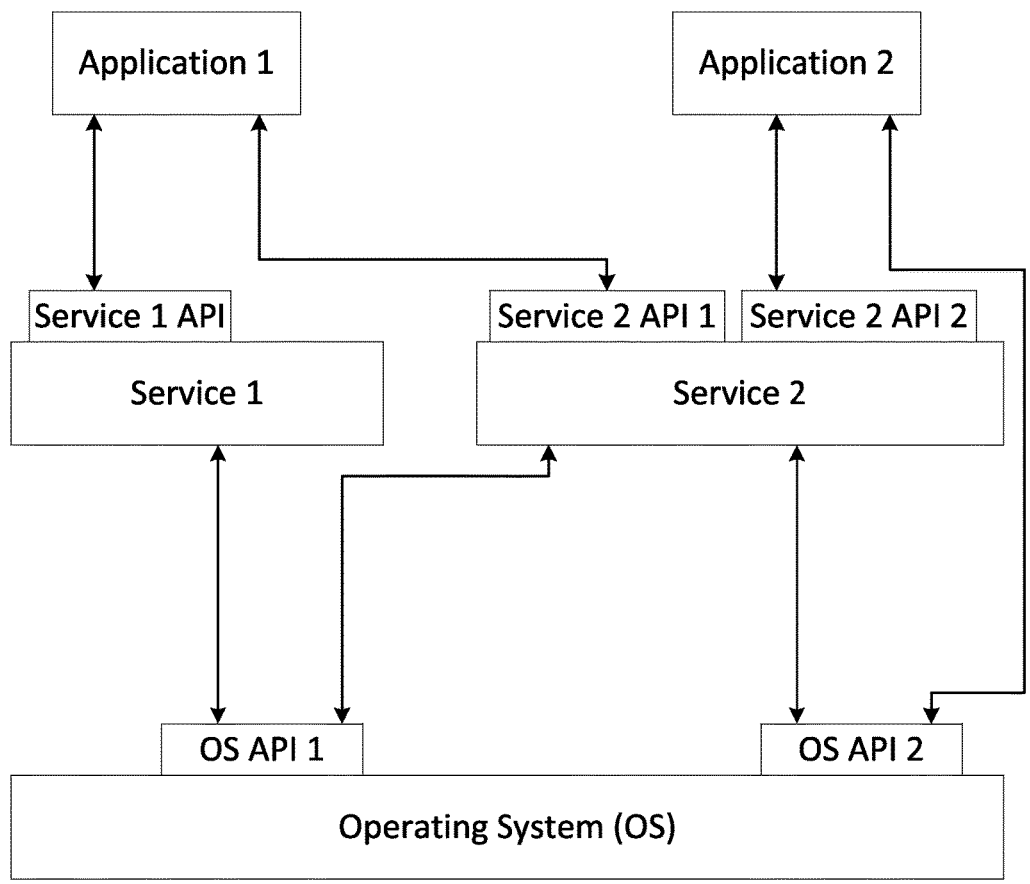
FIG. 6 illustrates an exemplary software stack of an API according to examples of the disclosure.

In the exemplary software stack shown in FIG. 6, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 7:
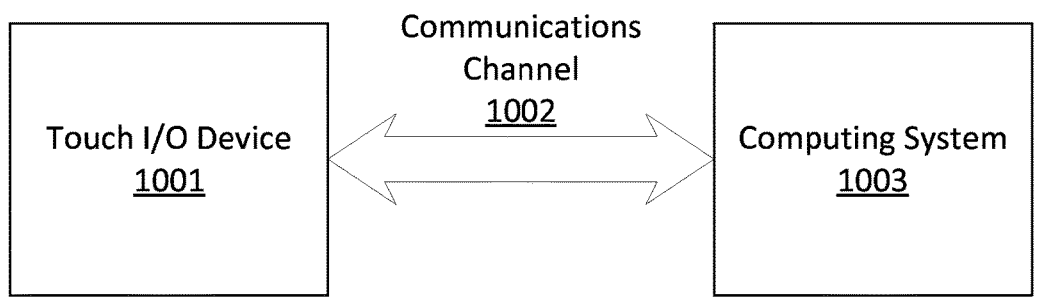
FIG. 7 is a block diagram illustrating exemplary interactions between the touch screen and other components of the device according to examples of the disclosure.

FIG. 7 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensing panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensing surface for receiving touch input.

In one example, touch I/O device 1001 embodied as a touch screen may include a transparent and/or semitransparent touch sensing panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensing components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 8:
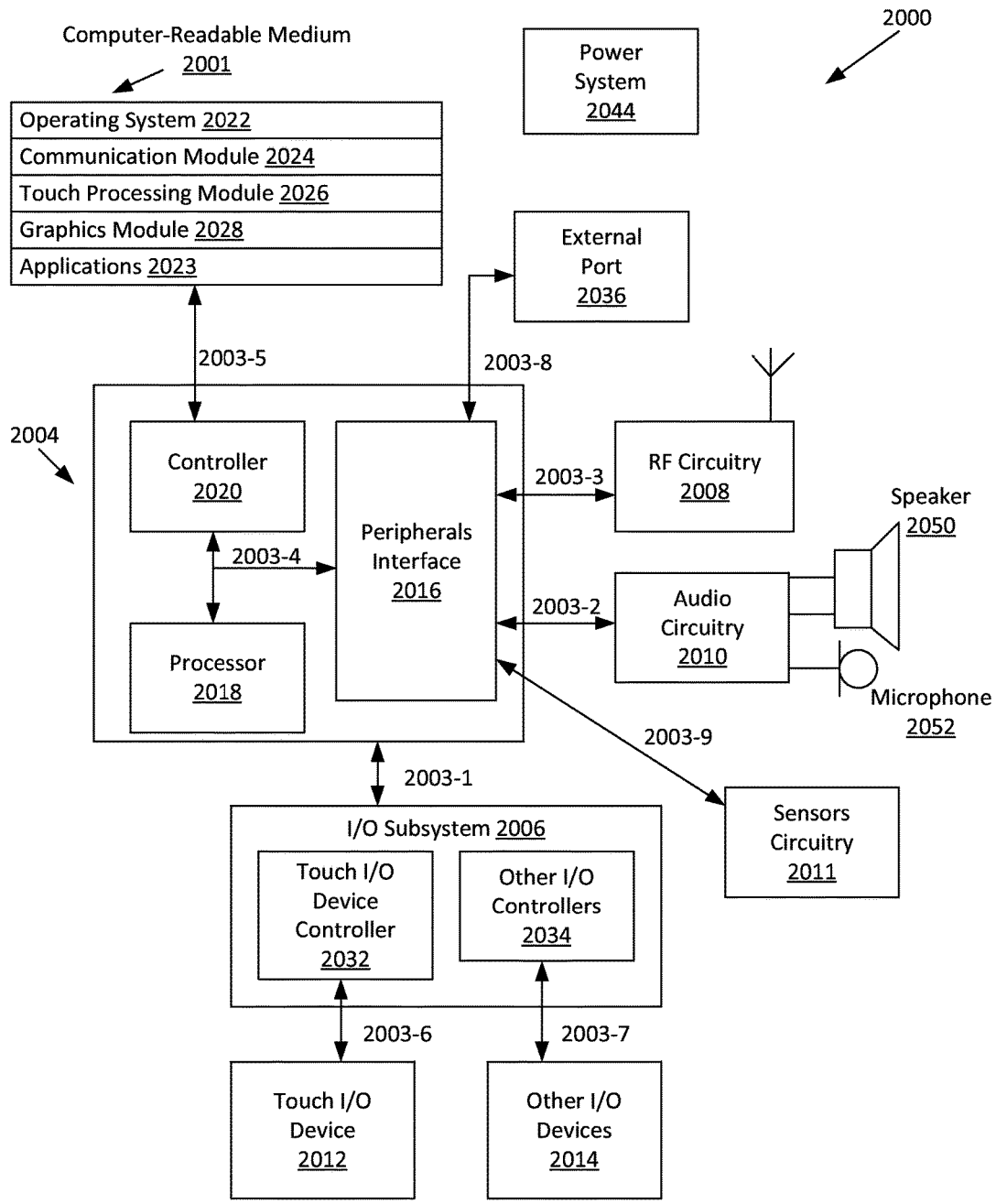
FIG. 8 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 8 is a block diagram of one example of system 2000 that generally includes one or more computer-readable mediums 2001, processing system 2004, I/O subsystem 2006, radio frequency (RF) circuitry 2008, audio circuitry 2010, and sensors circuitry 2011. These components may be coupled by one or more communication buses or signal lines 2003.

It should be apparent that the architecture shown in FIG. 8 is only one example architecture of system 2000, and that system 2000 could have more or fewer components than shown, or a different configuration of components. The various components shown in FIG. 8 can be implemented in hardware, software, firmware or any combination thereof, including one or more signal processing and/or application specific integrated circuits.

RF circuitry 2008 can be used to send and receive information over a wireless link or network to one or more other devices and includes well-known circuitry for performing this function. RF circuitry 2008 and audio circuitry 2010 can be coupled to processing system 2004 via peripherals interface 2016. Interface 2016 can include various known components for establishing and maintaining communication between peripherals and processing system 2004. Audio circuitry 2010 can be coupled to audio speaker 2050 and microphone 2052 and can include known circuitry for processing voice signals received from interface 2016 to enable a user to communicate in real-time with other users. In some examples, audio circuitry 2010 can include a headphone jack (not shown). Sensors circuitry 2011 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like.

Peripherals interface 2016 can couple the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. In some examples, medium 2001 can be a non-transitory computer-readable storage medium. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can run various software components stored in medium 2001 to perform various functions for system 2000. In some examples, the software components can include operating system 2022, communication module (or set of instructions) 2024, touch processing module (or set of instructions) 2026, graphics module (or set of instructions) 2028, and one or more applications (or set of instructions) 2030. Each of these modules and above noted applications can correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 can include various procedures, sets of instructions, software components and/or drivers for controlling and managing general system tasks (e.g., memory management, storage device control, power management, etc.) and facilitates communication between various hardware and software components.

Communication module 2024 can facilitate communication with other devices over one or more external ports 2036 or via RF circuitry 2008 and can include various software components for handling data received from RF circuitry 2008 and/or external port 2036.

Graphics module 2028 can include various known software components for rendering, animating and displaying graphical objects on a display surface. In examples in which touch I/O device 2012 is a touch sensing display (e.g., touch screen), graphics module 2028 can include components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 can include various software components for performing various tasks associated with touch I/O device 2012 including but not limited to receiving and processing touch input received from I/O device 2012 via touch I/O device controller 2032.

I/O subsystem 2006 can be coupled to touch I/O device 2012 and one or more other I/O devices 2014 for controlling or performing various functions. Touch I/O device 2012 can communicate with processing system 2004 via touch I/O device controller 2032, which can include various components for processing user touch input (e.g., scanning hardware). One or more other input controllers 2034 can receive/send electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 can display visual output to the user in a GUI. The visual output may include text, graphics, video, and any combination thereof. Some or all of the visual output may correspond to user-interface objects. Touch I/O device 2012 can form a touch sensing surface that accepts touch input from the user. Touch I/O device 2012 and touch screen controller 2032 (along with any associated modules and/or sets of instructions in medium 2001) can detect and track touches or near touches (and any movement or release of the touch) on touch I/O device 2012 and can convert the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In examples for which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 can also include power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Examples of the disclosure can be advantageous in preventing a device from reaching its UVLO threshold and powering off, thereby allowing the device to be used for a longer period of time.

In some examples, a method of an electronic device including a plurality of modules is disclosed. The method may include: receiving a first power request for a first module of the plurality of modules; receiving a second power request for a second module of the plurality of modules; assigning a first power budget to the first module; assigning a second power budget to the second module based on the first power budget; and drawing power at the first module based on the first power budget, and at the second module based on the second power budget. Additionally or alternatively to one or more of the above examples, the method may further include: assigning a first priority to the first module and a second priority to the second module, wherein assigning the second power budget may be further based on the first and second priorities. Additionally or alternatively to one or more of the above examples, the first power budget may be assigned before the second power budget, and the method may further include reducing the first power budget based on a determination that the second priority is higher than the first priority. Additionally or alternatively to one or more of the above examples, reducing the first power budget may include: notifying the first module that the first power budget has been revoked; and reducing power to the first module, wherein the second power budget may be assigned only after the power to the first module has been reduced. Additionally or alternatively to one or more of the above examples, the first priority may be assigned with respect to a particular functionality of the first module. Additionally or alternatively to one or more of the above examples, the method may further include: determining that the first power request is associated with a user-initiated task, wherein the first priority may be assigned based on the determination that the first power request is associated with a user-initiated task. Additionally or alternatively to one or more of the above examples, the method may further include: receiving a third power request for a third module of the plurality of modules; and denying the third power request based on the first and second power budgets. Additionally or alternatively to one or more of the above examples, assigning the first power budget to the first module may be based on a charge level of a battery of the electronic device. Additionally or alternatively to one or more of the above examples, the electronic device may include a power supply, and the method may further include: obtaining a first characteristic of the power supply; and determining that the first characteristic is lower than a first threshold; wherein the first power budget may be assigned to the first module based on the determination that the first characteristic is lower than the first threshold. Additionally or alternatively to one or more of the above examples, the first power budget may be assigned to the first module based on the relationship between the first characteristic and the first threshold over time.

In some examples, a method of an electronic device including a power supply and a first module is disclosed. The method may include: obtaining a voltage level of the power supply; determining that the voltage level is lower than a first threshold; and in accordance with a determination that the voltage level is lower than the first threshold, modifying a state of the first module. Additionally or alternatively to one or more of the above examples, the method may further include: determining that the voltage level is lower than a second threshold, lower than the first threshold; and in accordance with a determination that the voltage level is lower than the second threshold, powering off the device. Additionally or alternatively to one or more of the above examples, modifying the state may include preventing the first module from drawing power for a predefined period of time. Additionally or alternatively to one or more of the above examples, modifying the state may include changing a mode of the first module for a predefined period of time.

In some examples, a non-transitory computer readable storage medium storing one or more programs is disclosed. The one or more programs may include instructions, which when executed by an electronic device including a plurality of modules, cause the electronic device to perform a method including: receiving a first power request for a first module of the plurality of modules; receiving a second power request for a second module of the plurality of modules; assigning a first power budget to the first module; assigning a second power budget to the second module based on the first power budget; and drawing power at the first module based on the first power budget, and at the second module based on the second power budget. Additionally or alternatively to one or more of the above examples, the method may further include: assigning a first priority to the first module and a second priority to the second module, wherein assigning the second power budget may be further based on the first and second priorities. Additionally or alternatively to one or more of the above examples, the first power budget may be assigned before the second power budget, and the method may further include reducing the first power budget based on a determination that the second priority is higher than the first priority. Additionally or alternatively to one or more of the above examples, reducing the first power budget may include: notifying the first module that the first power budget has been revoked; and reducing power to the first module, wherein the second power budget may be assigned only after the power to the first module has been reduced. Additionally or alternatively to one or more of the above examples, the first priority may be assigned with respect to a particular functionality of the first module. Additionally or alternatively to one or more of the above examples, the method may further include: determining that the first power request is associated with a user-initiated task, wherein the first priority may be assigned based on the determination that the first power request is associated with a user-initiated task. Additionally or alternatively to one or more of the above examples, the method may further include: receiving a third power request for a third module of the plurality of modules; and denying the third power request based on the first and second power budgets. Additionally or alternatively to one or more of the above examples, assigning the first power budget to the first module may be based on a charge level of a battery of the electronic device. Additionally or alternatively to one or more of the above examples, the electronic device may include a power supply, and the method may further include: obtaining a first characteristic of the power supply; and determining that the first characteristic is lower than a first threshold; wherein the first power budget may be assigned to the first module based on the determination that the first characteristic is lower than the first threshold. Additionally or alternatively to one or more of the above examples, the first power budget may be assigned to the first module based on the relationship between the first characteristic and the first threshold over time.

In some examples, a non-transitory computer readable storage medium storing one or more programs is disclosed. The one or more programs may include instructions, which when executed by an electronic device including a power supply and a first module, cause the electronic device to perform a method including: obtaining a voltage level of the power supply; determining that the voltage level is lower than a first threshold; and in accordance with a determination that the voltage level is lower than the first threshold, modifying a state of the first module. Additionally or alternatively to one or more of the above examples, the method may further include: determining that the voltage level is lower than a second threshold, lower than the first threshold; and in accordance with a determination that the voltage level is lower than the second threshold, powering off the device. Additionally or alternatively to one or more of the above examples, modifying the state may include preventing the first module from drawing power for a predefined period of time. Additionally or alternatively to one or more of the above examples, modifying the state may include changing a mode of the first module for a predefined period of time.

In some examples, an electronic device is disclosed. The electronic device may include: one or more processors; memory; a plurality of modules; and one or more programs, wherein the one or more programs may be stored in the memory and configured to be executed by the one or more processors, which when executed by the one or more processors, cause the electronic device to perform a method including: receiving a first power request for a first module of the plurality of modules; receiving a second power request for a second module of the plurality of modules; assigning a first power budget to the first module; assigning a second power budget to the second module based on the first power budget; and drawing power at the first module based on the first power budget, and at the second module based on the second power budget. Additionally or alternatively to one or more of the above examples, the method may further include: assigning a first priority to the first module and a second priority to the second module, wherein assigning the second power budget may be further based on the first and second priorities. Additionally or alternatively to one or more of the above examples, the first power budget may be assigned before the second power budget, and the method may further include reducing the first power budget based on a determination that the second priority is higher than the first priority. Additionally or alternatively to one or more of the above examples, reducing the first power budget may include: notifying the first module that the first power budget has been revoked; and reducing power to the first module, wherein the second power budget may be assigned only after the power to the first module has been reduced. Additionally or alternatively to one or more of the above examples, the first priority may be assigned with respect to a particular functionality of the first module. Additionally or alternatively to one or more of the above examples, the method may further include: determining that the first power request is associated with a user-initiated task, wherein the first priority may be assigned based on the determination that the first power request is associated with a user-initiated task. Additionally or alternatively to one or more of the above examples, the method may further include: receiving a third power request for a third module of the plurality of modules; and denying the third power request based on the first and second power budgets. Additionally or alternatively to one or more of the above examples, assigning the first power budget to the first module may be based on a charge level of a battery of the electronic device. Additionally or alternatively to one or more of the above examples, the electronic device may include a power supply, and the method may further include: obtaining a first characteristic of the power supply; and determining that the first characteristic is lower than a first threshold; wherein the first power budget may be assigned to the first module based on the determination that the first characteristic is lower than the first threshold. Additionally or alternatively to one or more of the above examples, the first power budget may be assigned to the first module based on the relationship between the first characteristic and the first threshold over time.

In some examples, an electronic device is disclosed. The electronic device may include: one or more processors; memory; a power supply; a first module; and one or more programs, wherein the one or more programs may be stored in the memory and configured to be executed by the one or more processors, which when executed by the one or more processors, cause the electronic device to perform a method including: obtaining a voltage level of the power supply; determining that the voltage level is lower than a first threshold; and in accordance with a determination that the voltage level is lower than the first threshold, modifying a state of the first module. Additionally or alternatively to one or more of the above examples, the method may further include: determining that the voltage level is lower than a second threshold, lower than the first threshold; and in accordance with a determination that the voltage level is lower than the second threshold, powering off the device. Additionally or alternatively to one or more of the above examples, modifying the state may include preventing the first module from drawing power for a predefined period of time. Additionally or alternatively to one or more of the above examples, modifying the state may include changing a mode of the first module for a predefined period of time.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method of an electronic device including a plurality of modules and a power supply, the method comprising:

obtaining a first characteristic of the power supply;
comparing the first characteristic to a first threshold;
receiving a first power request for a first module of the plurality of modules;
receiving a second power request for a second module of the plurality of modules;
determining, at a peak power manager, whether the first power request is associated with the first module performing a first function or a second function, different from the first function;
assigning, at the peak power manager, a respective power budget to the first module based on the comparison of the first characteristic to the first threshold and the determination of whether the first power request is associated with the first module performing the first function or the second function, wherein:
  in accordance with a determination that the first power request is associated with the first module performing the first function, the respective power budget is a first respective power budget, and
  in accordance with a determination that the first power request is associated with the first module performing the second function, the respective power budget is a second respective power budget, different from the first respective power budget;
assigning, at the peak power manager, a second power budget to the second module based on the respective power budget; and
drawing power at the first module based on the respective power budget, and at the second module based on the second power budget.

2. The method of claim 1, the method further comprising:
assigning, at the power peak manager, a first priority to the first module and a second priority to the second module, wherein assigning the second power budget is further based on the first and second priorities.

3. The method of claim 2, wherein the respective power budget is assigned before the second power budget, the method further comprising:
  reducing the respective power budget based on a determination that the second priority is higher than the first priority.

4. The method of claim 3, wherein reducing the respective power budget includes:
  notifying the first module that the respective power budget has been revoked; and
  reducing power to the first module, wherein the second power budget is assigned only after the power to the first module has been reduced.

5. The method of claim 2, wherein assigning, at the power peak manager, the first priority to the first module and the second priority to the second module is based on the first module performing the first function or the second function, wherein:
  the first priority and the second priority are assigned before the respective power budget is assigned,
  the first priority is higher than the second priority based on a determination, at the peak power manager, that the first module is performing the first function, and
  the first priority is lower than the second priority based on a determination, at the peak power manager, that the first module is performing the second function.

6. The method of claim 1, wherein:
in accordance with a determination that the first power request is associated with a user-initiated task, the respective power budget is the first respective power budget, and in accordance with a determination that the first power request is not associated with the user-initiated task, the respective power budget is the second respective power budget, less than the first respective power budget.

7. The method of claim 1, the method further comprising:
determining that the first characteristic is lower than the first threshold;
wherein the respective power budget is assigned to the first module based on the determination that the first characteristic is lower than the first threshold.

8. The method of claim 7, wherein the respective power budget is assigned to the first module based on the relationship between the first characteristic and the first threshold over time.

9. The method of claim 1, wherein:
in accordance with a determination that the electronic device is performing a first device function, the respective power budget for the first module and the second power budget for the second module have first values, and
in accordance with a determination that the electronic device is performing a second device function, different from the first device function, the respective power budget for the first module and the second power budget for the second module have second values, different from the first values.

10. The method of claim 9, wherein:
the first module comprises RF circuitry,
the second module comprises a speaker,
the first device function comprises streaming media to the electronic device, and
the first values are greater than the second values.

11. The method of claim 1, wherein:
in accordance with a determination that the electronic device is in contact with a user, the respective power budget for the first module and the second power budget for the second module have first values, and
in accordance with a determination that the electronic device is not in contact with a user, the respective power budget for the first module and the second power budget for the second module have second values, different from the first values.

12. The method of claim 1, wherein the first module comprises RF circuitry.

13. The method of claim 1, wherein the first function is associated with a user-initiated task, the second function is associated with an automated task, and the first respective power budget is greater than the second respective power budget.

14. The method of claim 13, wherein the first module comprises a Wi-Fi controller, the user-initiated task comprises streaming media, and the automated task comprises automatically checking for application updates.

15. The method of claim 1, wherein the first module comprises a speaker, the first function comprises playing a ringtone, the second function comprises playing an SMS notification, and the first respective power budget is greater than the second respective power budget.

16. The method of claim 1, wherein:
the first power request for the first module of the plurality of modules is received, by the peak power manager, from software requesting to use the first module; and
the second power request for the second module of the plurality of modules is received, by the peak power manager, from software requesting to use the second module.

17. The method of claim 1, wherein the peak power manager is separate from the plurality of modules.

18. The method of claim 1, further comprising:
determining, at the peak power manager, whether the second power request is associated with the second module performing a third function or a fourth function, different from the third function;
wherein assigning, at the peak power manager, the respective power budget to the first module is further based the determination of whether the second power request is associated with the second module performing the third function or the fourth function.

19. The method of claim 18, wherein the respective power budget is assigned before the second power budget, the method further comprising:
reducing the respective power budget based on a determination, at the peak power manager, that the second power request is associated with the second module performing the third function.

20. A non-transitory computer readable storage medium storing one or more programs, the one or more programs comprising instructions, which when executed by an electronic device including a plurality of modules and a power supply, cause the electronic device to perform a method comprising:
obtaining a first characteristic of the power supply;
comparing the first characteristic to a first threshold;
receiving a first power request for a first module of the plurality of modules;
receiving a second power request for a second module of the plurality of modules;
determining, at a peak power manager, whether the first power request is associated with the first module performing a first function or a second function, different from the first function;
assigning, at the peak power manager, a respective power budget to the first module based on the comparison of the first characteristic to the first threshold and the determination of whether the first power request is associated with the first module performing the first function or the second function, wherein:
in accordance with a determination that the first power request is associated with the first module performing the first function, the respective power budget is a first respective power budget, and
in accordance with a determination that the first power request is associated with the first module performing the second function, the respective power budget is a second respective power budget, different from the first respective power budget;
assigning, at the peak power manager, a second power budget to the second module based on the respective power budget; and
drawing power at the first module based on the respective power budget, and at the second module based on the second power budget.

21. the non-transitory computer readable storage medium of claim 20, the method further comprising:
assigning, at the power peak manager, a first priority to the first module and a second priority to the second module, wherein assigning the second power budget is further based on the first and second priorities.

22. The non-transitory computer readable storage medium of claim 21, wherein the respective power budget is assigned before the second power budget, the method further comprising:
reducing the respective power budget based on determination that the second priority is higher than the first priority.

23. The non-transitory computer readable storage medium of claim 22, wherein reducing the respective power budget includes:
notifying the first module that the respective power budget has been revoked; and
reducing power to the first module, wherein the second power budget is assigned only after the power to the first module has been reduced.

24. The non-transitory computer readable storage medium of claim 21, wherein assigning, at the power peak manager, the first priority to the first module and the second priority to the second module is based on the first module performing the first function or the second function, wherein:
the first priority and the second priority are assigned before the respective power budget is assigned,
the first priority is higher than the second priority based on a determination, at the peak power manager, that the first module is performing the first function, and
the first priority is lower than the second priority based on a determination, at the peak power manager, that the first module is performing the second function.

25. The non-transitory computer readable storage medium of claim 20, wherein:
in accordance with a determination that the first power request is associated with a user-initiated task, the respective power budget is the first respective power budget, and
in accordance with a determination that the first power request is not associated with the user-initiated task, the respective power budget is the second respective power budget, less than the first respective power budget.

26. The non-transitory computer readable storage medium of claim 20, the method further comprising:
determining that the first characteristic is lower than the first threshold;
wherein the respective power budget is assigned to the first module based on the determination that the first characteristic is lower than the first threshold.

27. The non-transitory computer readable storage medium of claim 26, wherein the respective power budget is assigned to the first module based on the relationship between the first characteristic and the first threshold over time.

28. The non-transitory computer readable storage medium of claim 20, the method further comprising:
determining, at the peak power manager, whether the second power request is associated with the second module performing a third function or a fourth function, different from the third function;
wherein assigning, at the peak power manager, the respective power budget to the first module is further based the determination of whether the second power request is associated with the second module performing the third function or the fourth function.

29. The non-transitory computer readable storage medium of claim 28, wherein the respective power budget is assigned before the second power budget, the method further comprising:
reducing the respective power budget based on a determination, at the peak power manager, that the second power request is associated with the second module performing the third function.

30. An electronic device, comprising:
one or more processors;
memory;

a plurality of modules;

a power supply; and one or more programs, wherein the one or more programs are stored in the memory and configured to be executed by the one or more processors, which when executed by the one or more processors, cause the electronic device to perform a method comprising:

obtaining a first characteristic of the power supply;

comparing the first characteristic to a first threshold;

receiving a first power request for a first module of the plurality of modules;

receiving a second power request for a second module of the plurality of modules;

determining, at a peak power manager, whether the first power request is associated with the first module performing a first function or a second function, different from the first function;

assigning, at the peak power manager, a respective power budget to the first module based on the comparison of the first characteristic to the first threshold and the determination of whether the first power request is associated with the first module performing the first function or the second function, wherein:

in accordance with a determination that the first power request is associated with the first module performing the first function, the respective power budget is a first respective power budget, and in accordance with a determination that the first power request is associated with the first module performing the second function, the respective power budget is a second respective power budget, different from the first respective power budget;

assigning, at the peak power manager, a second power budget to the second module based on the respective power budget; and drawing power at the first module based on the respective power budget, and at the second module based on the second power budget.

31. The electronic device of claim 30, the method further comprising:

assigning, at the peak power manager, a first priority to the first module and a second priority to the second module, wherein assigning the second power budget is further based on the first and second priorities.

32. The electronic device of claim 31, wherein the respective power budget is assigned before the second power budget, the method further comprising:

reducing the respective power budget based on a determination that the second priority is higher than the first priority.

33. The electronic device of claim 32, wherein reducing the respective power budget includes:

notifying the first module that the respective power budget has been revoked; and reducing power to the first module, wherein the second power budget is assigned only after the power to the first module has been reduced.

34. The electronic device of claim 31, wherein assigning, at the power peak manager, the first priority to the first module and the second priority to the second module is based on the first module performing the first function or the second function, wherein:

the first priority and the second priority are assigned before the respective power budget is assigned, the first priority is higher than the second priority based on a determination, at the peak power manager, that the first module is performing the first function, and the first priority is lower than the second priority based on a determination, at the peak power manager, that the first module is performing the second function.

35. The electronic device of claim 30, the method further comprising:

determining, at the peak power manager, whether the second power request is associated with the second module performing a third function or a fourth function, different from the third function;

wherein assigning, at the peak power manager, the respective power budget to the first module is further based the determination of whether the second power request is associated with the second module performing the third function or the fourth function.

36. The electronic device of claim 35, wherein the respective power budget is assigned before the second power budget, the method further comprising:

reducing the respective power budget based on a determination, at the peak power manager, that the second power request is associated with the second module performing the third function.

* * * * *